United States Patent [19]
Atwater

[11] 3,879,915
[45] Apr. 29, 1975

[54] SPACER ELEMENT FOR STRUCTURAL UNIT

[75] Inventor: Wayne G. Atwater, Willoughby, Ohio

[73] Assignee: The Triax Company, Cleveland, Ohio

[22] Filed: July 1, 1974

[21] Appl. No.: 484,660

Related U.S. Application Data

[63] Continuation-in-part of Ser. No. 301,528, Oct. 27, 1972, Pat. No. 3,840,124.

[52] U.S. Cl. ............................. 52/758 C; 211/182
[51] Int. Cl. ............................................. F16b 7/18
[58] Field of Search.......... 403/189, 406; 52/758 R, 52/758 C, 758 F, 760; 211/182, 134

[56] References Cited
UNITED STATES PATENTS

| 511,660 | 12/1893 | Sprague | 403/406 |
| 2,729,064 | 1/1956 | Kennedy et al. | 52/758 C X |
| 2,919,149 | 12/1959 | Farley | 211/182 X |
| 3,229,790 | 1/1966 | Shayne | 211/182 X |
| 3,323,655 | 6/1967 | Foran et al. | 211/134 |

FOREIGN PATENTS OR APPLICATIONS

| 199,337 | 8/1958 | Austria | 403/189 |

Primary Examiner—Werner H. Schroeder
Assistant Examiner—Wayne L. Shedd
Attorney, Agent, or Firm—Baldwin, Egan, Walling & Fetzer

[57] ABSTRACT

A spacer element for a structural unit, such as for instance a storage framework composed of a plurality of storage frame components assembled into a storage rack for use in warehousing systems. The framework comprises generally vertical column members which in certain embodiments may be of hollow thin wall, polygonal configuration in horizontal cross section. Connecting members including load carrying means are spaced vertically along the columns and define the storage volumes in the storage rack. The load carrying means comprise assemblies including elongated members extending laterally relative to the columns. Actuatable fastener means connect the connecting members including the load carrying assemblies to the columns, and means including said spacer element are provided for prestressing certain of the members by deforming the latter at their connections with the other members and in the vicinity of the fastener means upon tightening of the latter, whereby a high-strength, rigid assembly is produced. The component parts of the rack assembly may be fabricated, and their manufacture, preparation and handling for assembly at a location of use wherein they are fastened into position, is materially enhanced.

12 Claims, 28 Drawing Figures

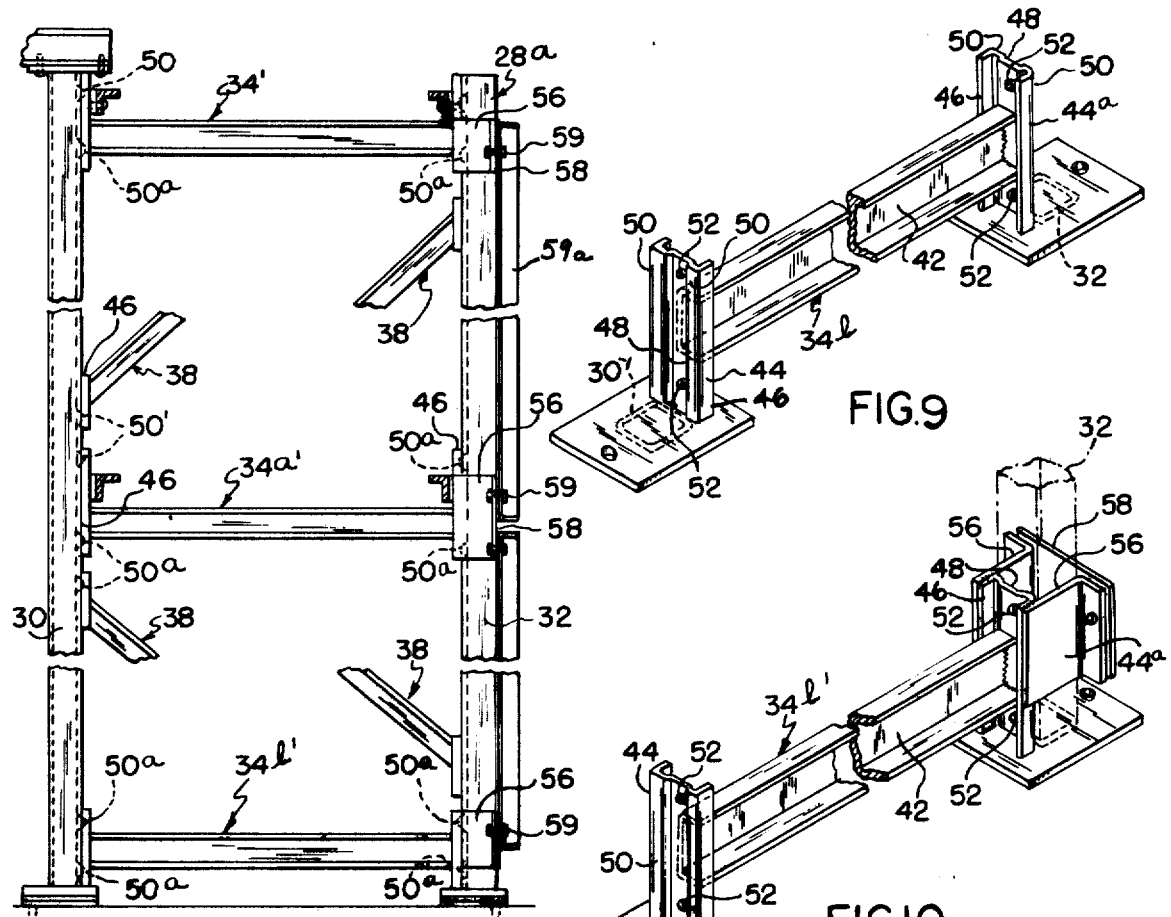
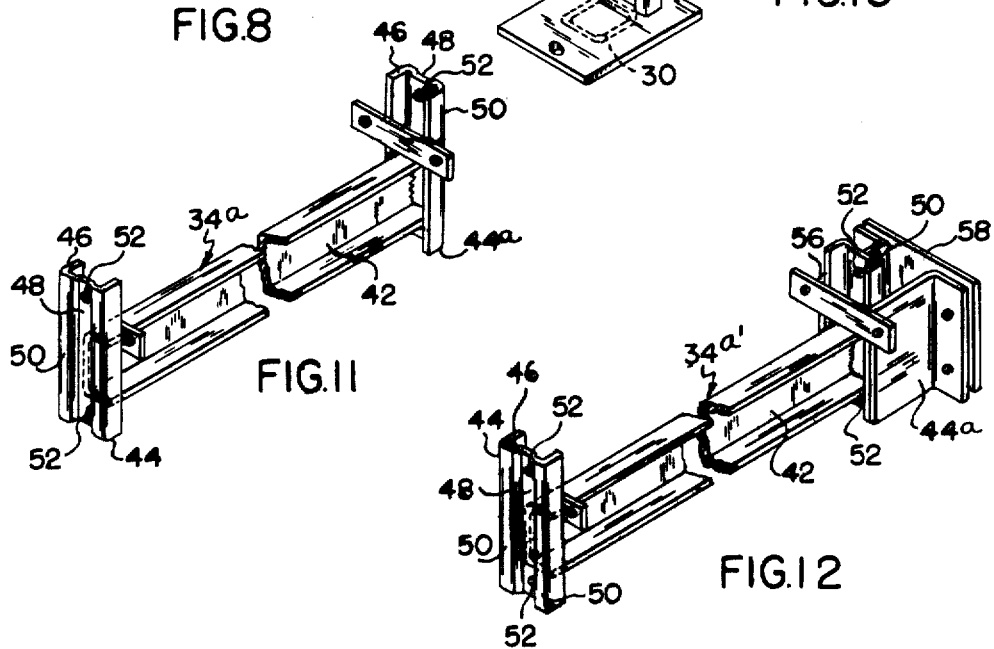
FIG.8  FIG.9  FIG.10  FIG.11  FIG.12

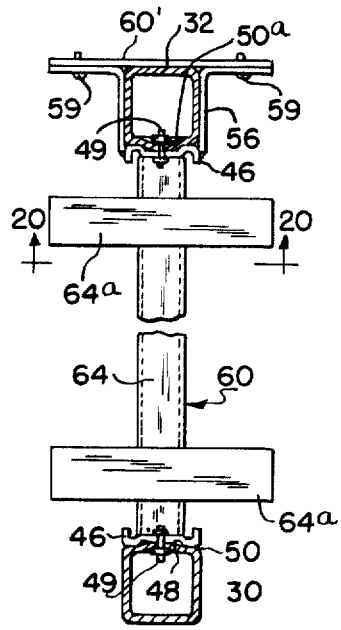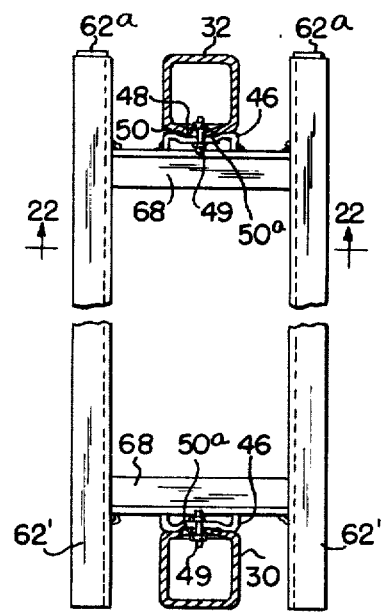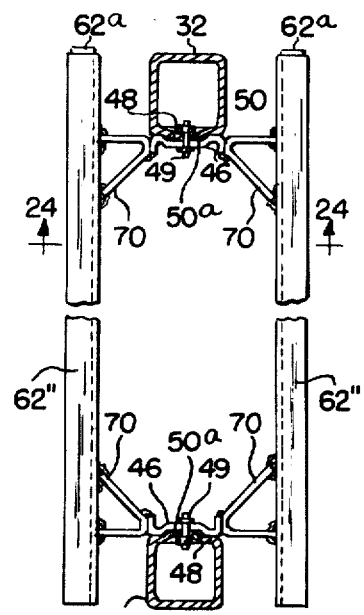
FIG.19  FIG.21  FIG.23
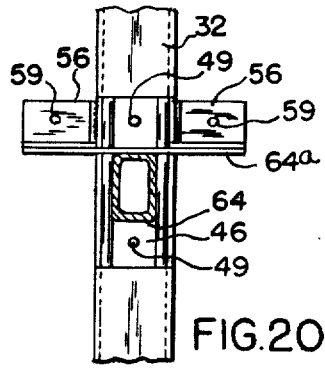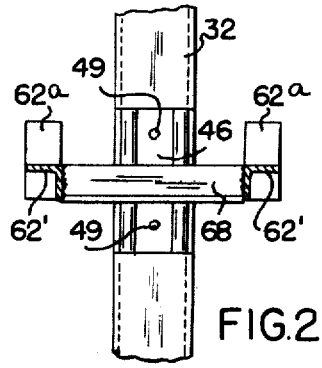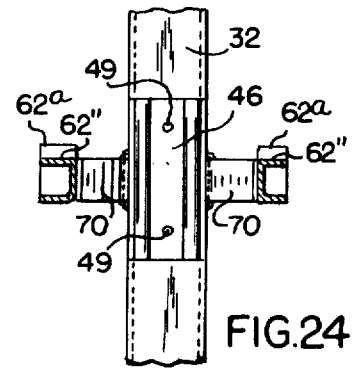
FIG.20  FIG.22  FIG.24
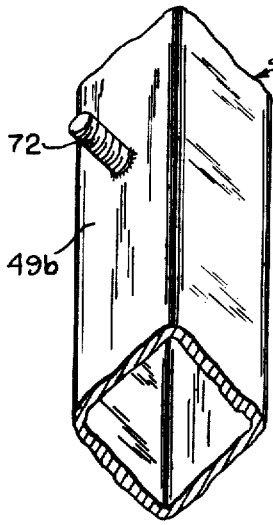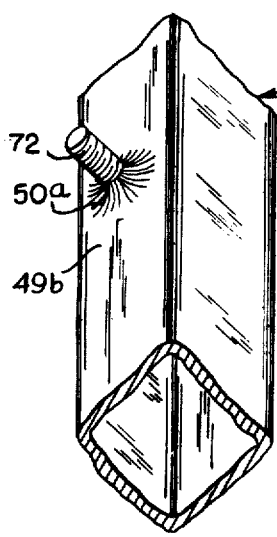
FIG.25  FIG.26

3,879,915

SPACER ELEMENT FOR STRUCTURAL UNIT

This application is a division of application Ser. No. 301,528, filed Oct. 27, 1972, now U.S. Pat. No. 3,840,124 issued Oct. 8, 1974.

This invention relates to knock-down structural components including a spacer element for use in the building of a structural unit, such as a storage rack for warehousing systems, and especially automatic warehousing systems, and wherein the storage rack comprises a plurality of columns secured by a novel arrangement to laterally extending connecting members, including load bearing assemblies defining the storage volumes in the storage rack, for materially improving the rigidity of the storage rack and substantially increasing its resistance to joint separation of the columns and connecting members. The various components forming the storage rack are so constructed and arranged that they can be readily handled and bundled at the point of manufacture and may be conveniently shipped to a location of use and assembled at the work site, utilizing suitable commercially available fasteners. A novel plate-like spacer or connecting member is provided for connecting component parts of the storage rack together at the site of use, resulting in a highly rigid, knock-down storage rack.

BACKGROUND OF THE INVENTION

It is conventional practice to fabricate the storage rack sections for automatic warehousing systems at a manufacturing facility and ship the fabricated sections to the site of use, where they may be assembled with other components to form the completed storage rack. Factory fabrication and handling of the assembled sections, sometimes identified as "ladders," of a storage rack is difficult to say the least, especially as the sizes of the component assemblies increase due to larger warehousing systems. Polygonal (in cross section) shapes, such as square or rectangular tubing, has often times been used for the load bearing columns of such storage racks and has considerable customer appeal. However, economical application has almost always necessitated the use of welding for attaching together the component parts of the storage rack, including the columns, due to the usually non-readily accessible interior of the columns for attaching mechanical fasteners such as bolts and nuts or the like. Since welding is usually required with such type of column, large prefabricated structural assemblies result which materially increase the fabricating, handling, shipping and assembly costs of such a storage rack structure.

SUMMARY OF THE INVENTION

The present invention relates to various structural components and assemblies for forming a structural unit such as a storage rack for use in, for instance, automatic warehousing systems, and wherein such components are substantially rectilinear in configuration making them adapted to assembly line fabrication, cleaning and painting, and making possible expeditious handling of the storage rack components in relatively compact bundles for shipment. The components are such that they can be readily assembled into a storage rack at its location of use. The load bearing column members of the storage rack may in certain embodiments be of a polygonal (in horizontal cross section) hollow configuration, and means including a novel spacer or plate-like connecting member are provided at the connection of the column members to the cross connecting members and assemblies, which connections include actuatable fastening means, for materially increasing the rigidity of the connections between the cross members and columns upon tightening actuation of the associated fastening means.

Accordingly, an object of the invention is to provide a novel spacer or plate-like connecting member for a structural unit connection.

Another object of the invention is to provide a storage framework which can be readily assembled on site, and wherein the components for constructing the framework or racking are of a generally rectilinear type, facilitating the handling thereof during manufacture, bundling and shipping to the site of use.

A further object of the invention is to provide a storage framework of the above-described type wherein the load bearing columns of the storage framework are of hollow polygonal configuration in transverse cross section, and a novel connecting arrangement including a spacer or plate-like connecting member is provided for rigidifying the connections of the cross members of the storage rack with the columns, whereby mechanical fastening means can be utilized for expeditiously connecting the cross members to the columns in a high strength, rigid assembly.

A further object of the invention is to provide a spacer or plate-like connecting member for a storage framework of the latter type, wherein the generally vertical wall of the column at the connection with a cross member is deformed outwardly into a conical-like bulge at the vicinity of the fastener during tightening of the latter, which results in a connection joint of substantial rigidity and resistance to joint separation.

A further object of the invention is to provide a connection including a plate-like spacer for the components of a storage rack of the above-described type wherein a mechanical fastener pulls or deforms a section of a coacting wall outwardly upon tightening actuation of the fastener, changing the bending stress to tension stress within the wall and resulting in substantial resistance to joint separation at the connection and a highly rigid storage rack arrangement.

Other objects and advantages of the invention will be apparent from the following description taken in conjunction with the accompanying drawings wherein:

BRIEF DESCRIPTION OF THE DRAWINGS

FIG. 8 is an enlarged, broken, elevational view of another "ladder" assembly utilized in the storage rack, and which is generally similar to that of the "ladder" assembly of FIG. 2, except that it includes diagonally arranged cross members and wherein an end portion of certain of the connecting or cross member assemblies comprises a recess portion for receiving therein the associated column;

FIG. 9 is an enlarged, broken, perspective view of the base cross member, utilized in the ladder assembly of FIG. 2;

FIG. 10 is a view similar to that of FIG. 9, but illustrating the base cross member utilized in the ladder assembly of FIG. 8;

FIG. 11 is an enlarged, broken, perspective illustration of the middle or intermediate cross member utilized in the ladder assembly of FIG. 2;

FIG. 12 is a view similar to that of FIG. 11 but illustrating the intermediate cross member of the ladder assembly of FIG. 8;

FIG. 19 is a view generally similar to that of FIG. 17 but showing a further embodiment of load support assembly, and one comprising lengthwise spaced crossed stub members instead of the elongated rail members utilized in the assembly of FIG. 17;

FIG. 20 is a fragmentary, sectional view taken along the plate of line 20—20 of FIG. 19 looking in the direction of the arrows;

FIG. 21 is a broken, top plan view generally similar to FIG. 17 but showing a further modified form of load support assembly, with such arrangement being identified as a heavy duty load support assembly for use with heavier types of loads;

FIG. 22 is a sectional view taken generally along the plane of line 22—22 of FIG. 21 looking in the direction of the arrows;

FIG. 23 is a broken, top plan view of a further modified form of load support assembly which utilizes K-like end portions for supporting elongated load support rails;

FIG. 24 is a sectional view taken generally along the plane of line 24—24 of FIG. 23 looking in the direction of the arrows;

FIG. 25 is a fragmentary perspective illustration showing a further modified form of column connection which includes an integral stud secured thereto and adapted for coaction with an end portion of an associated cross member assembly or load support assembly, for connecting the latter to the column;

FIG. 26 is a view similar to FIG. 25 but showing the outward deformation of the column wall adjacent the stud upon tightening of the nut coacting with the threaded stud, which causes the conical-like protrusion to be formed in the wall of the column, resulting in a storage rack connection of rigid nature;

DESCRIPTION OF THE PREFERRED EMBODIMENTS

Figure 1:
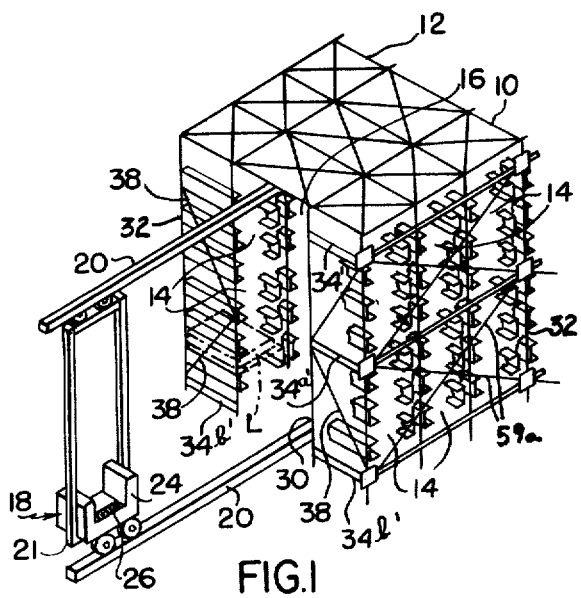
FIG. 1 is a fragmentary, generally diagrammatic perspective illustration of a storage rack and associated mechanized load carrier in an automatic warehousing system, and which includes the connection arrangement of the invention.
Figure 2:
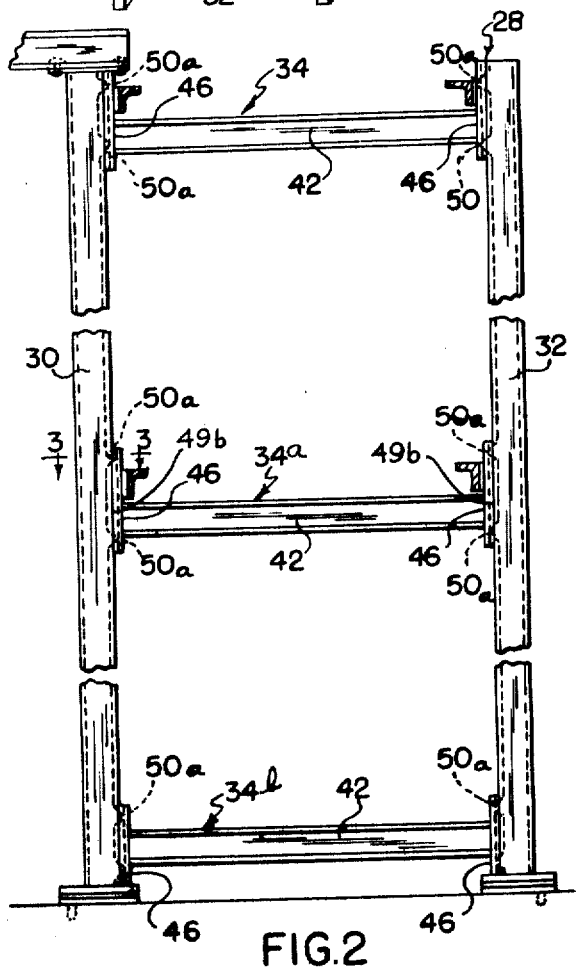
FIG. 2 is a broken elevational view of one of the "ladder" sub-assemblies which may be assembled in the form illustrated at the site of use, and which forms one of the components of the completed storage rack. The ladder assembly illustrated is comprised of vertical load bearing columns connected by cross members fastened by mechanical fasteners to the columns, with the connections including means which upon tightening actuation of the fasteners provides for prestressing deformation of the columns at the respective connection, resulting in a highly rigid sub-assembly.
Figures 13, 14:
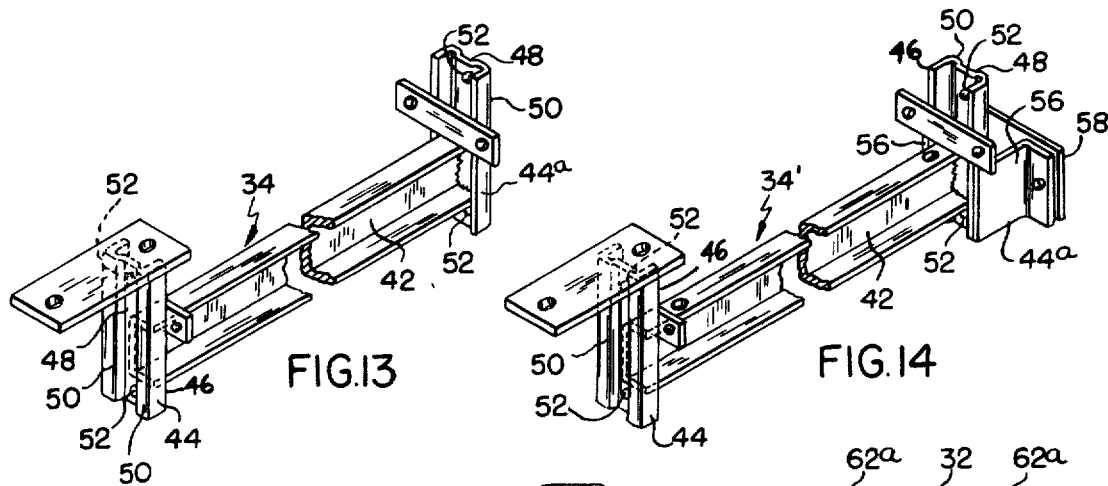
FIG. 13 is an enlarged, broken, perspective view illustrating the top cross member of the ladder assembly of FIG. 2.
FIG. 14 is an enlarged, broken, perspective view of the top cross member of the ladder assembly of FIG. 8.

Referring now again to the drawings, and particularly to FIGS. 1, 2 and 8 thereof, there is illustrated in FIG. 1 a portion of a storage rack of an automatic warehousing system comprising opposed storage sections 10 and 12, defining a plurality of horizontally and vertically arranged storage volumes or bins 14 which are adapted to store loads L therein with the loads disposed in bridging relation across associated load carrying members of the respective storage volume. In the illustration of FIG. 1 there is a storage rack section disposed on each side of a centrally located aisle or travel zone 16 in which an automatic or mechanized load carrier 18 is adapted to move on tracks or guides 20, for handling loads at selected storage bin locations in the storage frame section.

The load carrier mechanism 18 may comprise a horizontally movable carriage 21 on which is mounted a vertically movable elevator 24 which carries a transversely or laterally movable extractor mechanism 26 for placing loads into or removing loads from a selected storage volume. Reference may be had to U.S. Pat. 3,139,994 issued Jul. 7, 1964 in the name of A.R. Chasar and No. 3,402,835 issued Sept. 24, 1968 in the name of Sanford Saul for more detailed disclosures of automatic warehousing arrangements of the general type with which the present invention may be utilized.

Each storage frame section may be formed of a plurality of interconnected ladder assemblies 28 and 28$_a$ (FIGS. 2 and 8) which in turn are each comprised of an aisle post or column 30 adapted for disposal along the travel zone 16 and in longitudinal alignment with the aisle columns in the adjacent ladder assemblies, and a laterally spaced outer column or post 32 which is adapted for alignment with the corresponding outer columns in the adjacent ladder assemblies.

Figure 16:
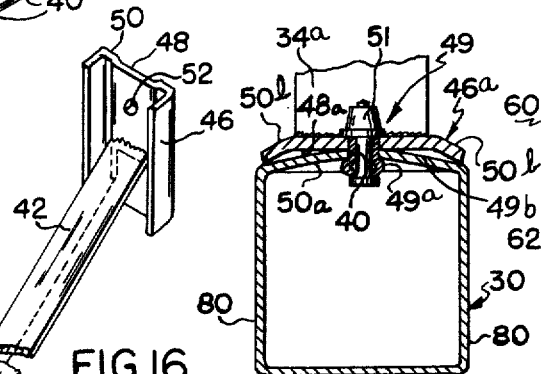
FIG. 16 is an enlarged, broken, perspective view of one of the diagonal cross members utilized in the ladder assembly of FIG. 8.

Cross member assemblies 34, 34$_a$ and 34$_b$ (FIG. 2) or 34', 34$_a$', and 34$_b$' (FIG. 8) extend between and are adapted for connection to the respective aisle and outer column, to form the respective ladder assembly. Cross members 34 to 34$_b$' may be the fabricated construction illustrated. The ladder components are so constructed and arranged that they can be expeditiously produced at a place of manufacture utilizing in line processes and procedures, and can be readily painted and handled during the manufacture thereof, and then can be bundled into compact bundles and shipped to the site of use, where the frame components can be readily assembled together into "ladders" and thence into complete storage racks, thereby obviating many of the problems heretofore associated with the manufacturing and shipping of the storage rack components. The ladder assembly 28a also includes diagonal cross members 38 extending diagonally between the aisle and outer post 30,32 of the respective ladder. Diagonal cross members 38 will be hereinafter described in greater detail and are shown in enlarged form in FIG. 16.

The columns 30,32 of the ladder assemblies 28,28a may be of thin wall, hollow tubing of polygonal configuration in transverse cross section. In the embodiment illustrated such tubing is of square or rectangular configuration in cross section, but it will be understood that other configurations of hollow tubing, such as triangular shaped tubing, or tubing having a greater number of sides than four, would also be satisfactory. "Thin wall" tubing as the term is utilized here, means steel tubing of from 7 U.S. St'd. gage on up. Tubing having a greater wall thickness than that found in 7 gage is too difficult to deform in the manner hereinafter set forth.

Figure 15:
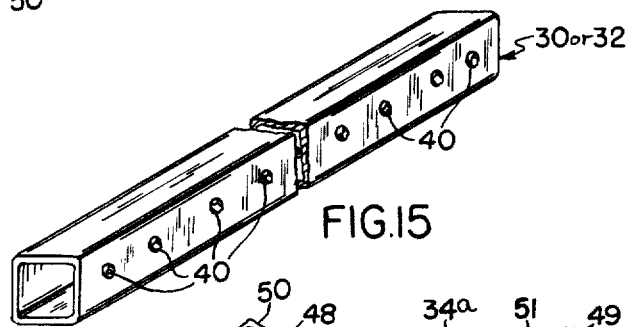
FIG. 15 is a broken, perspective view of one of the columns utilized in the storage rack.

Referring to FIG. 15, the columns 30 and 32 are preferably standardized, each being provided with openings 40 spaced along the lengthwise extent thereof and which are adapted to receive mechanical fastening means from exteriorly of the tubing, for connecting the various component parts including the aforementioned cross members, 34,34', 34$_a$ or 34$_a$', 34$_b$ or 34$_b$', to the columns, for formation of the ladders 28,28a and for connecting the "ladders" into a finished storage rack. Such a preformed, standardized arrangement of holes in the columns facilitates the assembly of the components at the site of use, and reduces the need for drilling operations at the site of use for forming the components together into a finalized storage framework.

Referring now to FIGS. 9 through 16, there is shown in enlarged scale the various cross members components 34, 34', 34$_a$ and 34$_a$', 34$_b$, 34$_b$' and 38 of the ladder assemblies 28 28a illustrated in FIGS. 2 and 8. Each cross member includes a generally elongated linearly extending central section 42 and end sections 44,44a, attached as by welds to the central section 42.

Figure 4:
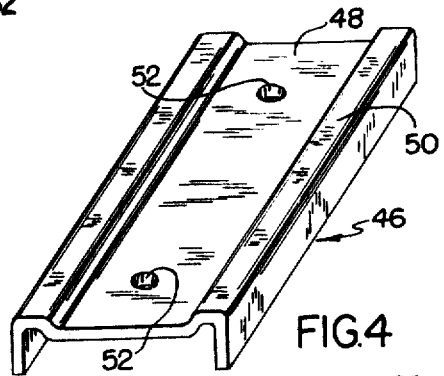
FIG. 4 is an enlarged perspective view of a spacing segment which is utilized as part of the cross member assembly of FIG. 2, to provide for spacing of the confronting wall of the column from the cross member assembly, so upon tightening of the fastener means associated with the connection of the cross member assembly to the column, the wall of the column will be deformed outwardly. The segment shown in FIG. 4 may be readily formed by pressing, stamping, forging or casting, or the like, from metal.

The end sections 44 include spacer means adapted for being disposed in confronting relation with respect to the confronting surface of the associated column (e.g., 30) for initially spacing said surface of the associated column from the central portion of the respective end section, while engaging the end section at its lateral extremities. One arrangement for accomplishing the latter is the channel member 46 illustrated in enlarged detail in FIG. 4 of the drawings, and which is shown as the component of each of the end sections 44,44$_a$ of the cross member assemblies illustrated in FIGS. 9 through 16.

Member 46 may be conveniently formed by means of a metal press or stamping machine which results in a central recess 48 and lateral raised or protruding portions 50 defining the lateral extremities of the recessed portion 48. Raised portions 50 are adapted to engage the confronting column or post of the associated ladder 28 or 28$_a$ and space the confronting substantially planar surface or face of the column from the confronting surface defining the recess 48. Blind mechanical fasteners 49 may then be utilized from exteriorly of the cross member, and such as for instance Huck type fasteners which are positioned through the openings 52 in the members 46, and a Huck gun is positioned on the protruding shank of the blind fastener. The shank of the fastener generally has annular rings to provide grip and as the gun begins to "draw," the blind fastener beings to bulb as at 49a (FIG. 3) on the inside of the column trapping the fastener. Continued pull by the gun draws the thin gauge tubing wall toward the recessed surface portion 48 of the spacer 46 to form a bulge or conical-like protrusion as at 50$_a$ surrounding the shank of the fastener.

Figure 3:
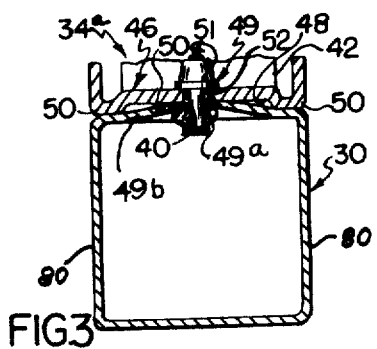
FIG. 3 is an enlarged, sectional view taken generally along the plate of line 3—3 of FIG. 2 looking in the direction of the arrows, and illustrating the deformed wall of the column providing a conical-like bulge at the mechanical fastener responsive to tightening actuation of the fastener.

As the fastener 49 pulls the web 49b of the column wall outwardly, the fiber stresses around the respective hole 40 change from bending to tension, and since tension is recognized as the least severe stress, this fiber stress change within the column wall produces a much more desirable stress arrangement. After surface contact of the bulging portion 50a of the column wall with the confronting surface of the recess portion 48 of the spacer member 46, a tensile clamping load occurs within the fastener, and at a predetermined clamp load (e.g. 7,000 pounds) the fastener head swags itself over the annular rings on the fastener shank as at 51 (FIG. 3). Finally, the gun pull breaks the fastener shank just outside the fastener head, and fastening of the spacer plate of the respective cross member assembly to the column is complete. By preselecting a recess depth for the spacer plate 46 that allows surface contact between the bulged portion 50a of the tubing wall and the recess portion 48 of the spacer at the instant that peak tube wall bulge is attained, optimum resistance to joint separation is achieved at the connection of the cross member assembly to the column.

While the arrangement illustrated is that of the column wall bulging while the confronting wall of the spacer member 46 has no visible deformation, it will be understood that by selecting a suitable thickness of the spacer member 46 wall in comparison to the thickness of the column wall, that the visible bulging due to tightening actuation of the fastener would or could occur in the spacer wall surrounding the fastener shank instead of in the column wall, or bulging might occur in both walls substantially simultaneously. However, the preferred arrangement is to have the visible bulging occur in the column wall only, as illustrated in the drawings.

FIG. 3 illustrates in enlarged detail the coaction of the blind fastener 49 after it has bulged the column wall outwardly into contact with the recess portion 48 of the spacer member, to securely fasten the cross member assembly to the column, resulting in a highly rigid assembly which can be expeditiously accomplished on the site of use.

Figure 5:
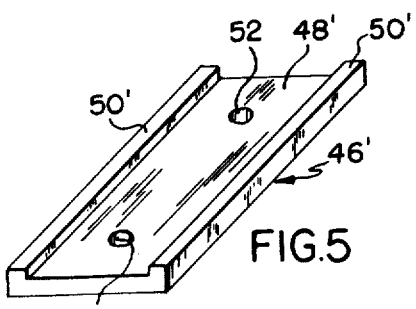
FIG. 5 is a view generally similar to that of FIG. 4 but showing an alternate form of spacing segment or spacing member, which has been manufactured by milling a slot out of a plate.

FIG. 5 shows a modified form of spacer plate 46' which has been milled from a flate plate, to produce the central recess section 48' and laterally disposed raised or protruding sections 50', which are adapted to engage a confronting column surface and space the recess section 48' from the confronting surface of the associated column, prior to tightening actuation of fastener means.

Figure 6:
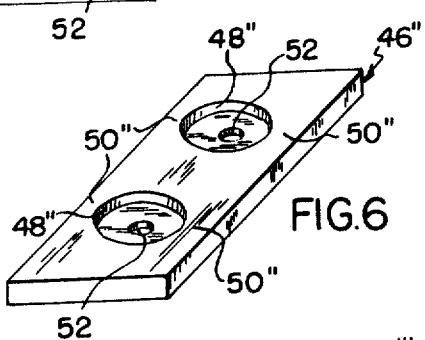
FIG. 6 is a view showing another alternate form of the segment of FIG. 4.

FIG. 6 shows a further modification of spacer plate 46" in which enlarged counterbored openings 48" provide recessed sections of the adaptor member for disposal in confronting relation to the surface of the associated column, and which in conjunction with lateral shoulder portions 50" provide for the bulging of the column wall into the recess portions 48" upon actuation or tightening of the associated fasteners extending through the column and through openings 52 in plate 46".

Figure 7:
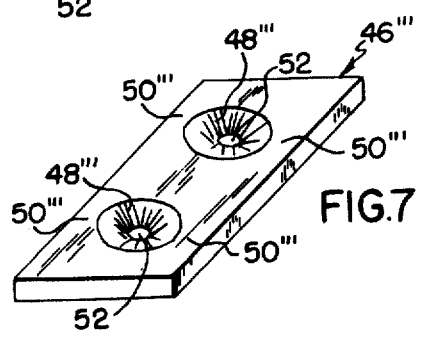
FIG. 7 is a perspective view showing a further embodiment of spacing member with the recesses therein formed by countersinking the plate.

FIG. 7 shows a further modification of adaptor plate 46'" wherein the holes 52 for receiving the fasteners therethrough are countersunk surrounding the holes, for providing inwardly sloping recessed portions 48'", to produce the bulbing of the column wall adjacent the fasteners, upon actuation of the fasteners and wherein the bulged portions of the column will engage the defining surfaces of the countersunk portions 48'". It will be noted that while most of the end spacer members 46 of the cross member assemblies are provided with two openings therethrough through which associated fasteners extend, the spacer members 46 of diagonal cross assembly 38 (FIG. 16) may be provided with only one fastener opening 52 therein, as shown.

The cross assemblies 34', 34$_a$' and 34$_b$' (FIGS. 10, 12 and 14) at one end portion (i.e., 44a) thereof, also include an open ended section formed by means of plates or other suitable members 56 secured as by welds to the associated spacer plate 46, and which receive therein in relatively snug relation the confronting column 32 as shown in FIG. 8. A removable or detachable cross plate 58 may be provided which extends across the open ended section and across the encompassed column, and is attached as by suitable fasteners (e.g. 59) to the open ended section, to positively hold and retain the column therein. Thereafter, tightening actuation of the blind fastener means 49 will cause the column wall confronting the associated end spacer plate member 46 to be bulged outwardly toward the recess section 48 of the spacer plate member and into engagement therewith, to provide a highly rigid storage rack. Such column receiving end of the end section 44a of the respective cross assembly, aids in strenghthening and rigidifying the associated ladder, and thus aids in rigidifying the complete storage rack. Column encompassing end sections 44a also provide rigid anchors for the diagonal bracing members 59a which criss cross the outer side of the storage structure as shown for instance in FIGS. 1 and 8.

Referring now to FIGS. 17 through 24, there is shown various arrangements of load support assemblies 60 for defining the respective storage volume or bin within the storage rack, and supporting loads thereon. Lateral pairs of the assemblies support loads thereon in bridging relation, with the loads being deposited on or removed from the load support assemblies by means of the aforementioned mechanized load carrier 18, with the extractor 26 on elevator 24 being extendible out into and retractable from the selected storage bin or volume, to handle a load L thereat. Each load support assembly 60 is adapted for attachment to the spaced associated columns 30,32 of an associated ladder, (FIGS. 2 or 8) as will be hereinafter described.

Figure 17:
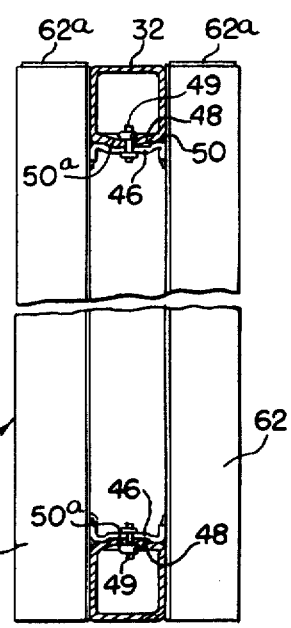
FIG. 17 is a broken top plan illustration of one of the load support assemblies adapted for assembly for instance with the "ladder" of FIG. 2, to define the associated storage volume in the storage rack, and showing the end portions thereof with the spacer means thereon for causing deformation of the associated column to which the respective end portion is attached, and also illustrating the load support rails attached to the end portions of the assembly.
Figure 18:
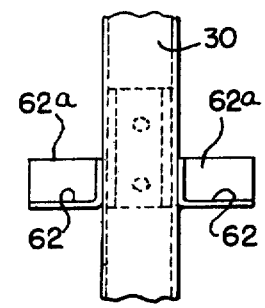
FIG. 18 is a fragmentary front elevational view of the load support assembly of FIG. 17.

In the load-support assembly of FIGS. 17 and 18, end spacer plates 46 are secured as by welds to lateral elongated load support rails 62 which are of angle configuration in end elevation (FIG. 18). The columns 30,32 are received in nested relation between the outer ends of the assembly 60, as shown in FIG. 17, and are attached to the spacer plates 46 by blind fasteners 49, in a generally similar manner as aforementioned in conjunction with FIG. 3. End abutment plates 62a may be provided for limiting movement of a load along rails 62.

Referring to FIGS. 19 and 20, the load support assembly 60 illustrated comprises a central elongated member 64 having cross support rails 64a attached thereto for supporting a load at its corners, disposed in briding relation across laterally disposed of said support assemblies. Attached to the ends of central member 64 as by welds, are spacer members 46 and blind fasteners (e.g., 49) coact with the spacer members to cause deformation of the associated column wall outwardly, as illustrated, to engage the recessed section 48 of the respective confronting spacer plate 46. This, as aforementioned, provides a rigid connection between the load support assembly and the associated columns of the storage rack. As can be seen, the end portion of the FIGS. 19,20 support assembly associated with column 32 includes an open ended section receiving in relatively snug encompassed relation the associated column, with a closure plate 60' closing over the open recess of the end portion and being secured as by fasteners 59. Such end portions also may provide anchors for diagonal bracing 59a as aforedescribed in connection with FIGS. 10, 12 and 14.

FIGS. 21 and 22 disclose a heavy duty load support assembly disposed between and attached to the spaced columns 30,32 of the respective ladder. The spacer plates 46 in this embodiment are attached as by welds to cross members 68, which in turn are attached as by welds to elongated load support rails 62'. Stops 62a may be provided on rails 62' in a generally similar manner as the stops in FIGS. 17 and 18.

FIGS. 23 and 24 disclose a K-like (in top plan) configuration of load support assembly, wherein spacer plates 46 are attached to brackets 70, as by means of welds, to form K-like supports for the elongated load support rails 62". It will be seen that in all of these load support assemblies illustrated, the spacer members 46 are disposed in confronting relation to the associated column, and upon tightening of the associated fastener, the column wall is pulled or deformed outwardly toward the recess portion of the spacer plate until engagement occurs therebetween, whereupon a highly rigid connection is formed.

FIGS. 25 and 26 show a modified form of column 30' or 32' wherein a stud 72 is secured to the wall of the column rather than having a fastener receiving opening through the wall as in the previous embodiments. Such securement of studs can be accomplished by means of conventional mechanism available for instance from the Nelson Stud Welding Division of Gregory Industries of Lorain, Ohio. The stud 72 is adapted to pass through the associated opening 52 in the spacer plate 46 and is threaded at its distal end so that upon tightening of the associated exteriorly accessible nut (not shown) onto the threaded stud, the wall of the column is pulled or drawn outwardly toward the recessed portion of the associated spacer plate in a similar manner as the previously described embodiments. The bulged portion of the tubing wall is adapted to engage the recessed portion of the associated confronting spacer plate in such studded column in the same general way that the blind fasteners of the previously described embodiments cause bulging of the column wall, to accomplish the rigid connection aforedescribed. FIG. 26 illustrates a section of studded column wherein the stud has been used to bulge the column wall outwardly as at 50a into a conical-like protrusion.

Figures 27, 28:
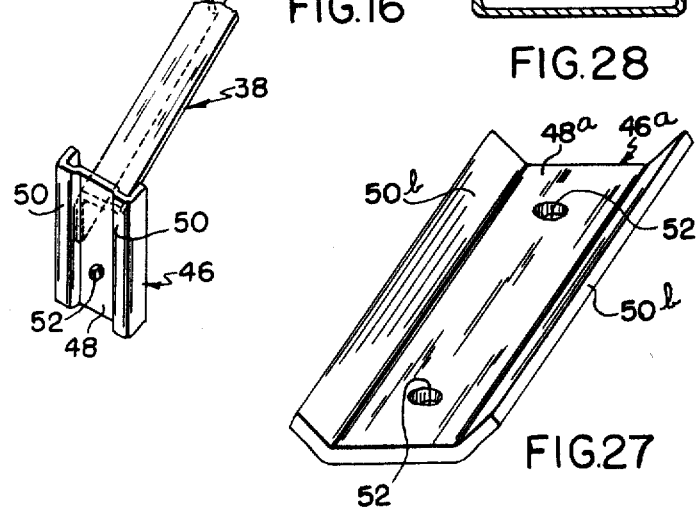
FIG. 27 is a view generally similar to that of FIG. 4, but showing another form of spacing segment or spacing member.
FIG. 28 is a view similar to FIG. 3 but illustrating the spacer member of FIG. 27 utilized in conjunction with a column, resulting in deformation of the column upon fastening actuation of the associated fastener.

FIGS. 27 and 28 show a further modified form of spacer member 46a, which may be conveniently formed from a plate bent or stamped into the configuration illustrated including the central recess section 48a and the laterally disposed protruding wing sections 50b. Openings 52 may be provided for receiving the fastener means which secures the spacer member to the confronting column. As can be seen in FIG. 28, the wing sections 50b engage the confronting relatively thin wall web of the column at the distal extremities thereof and generally at the juncture of the column web with the side walls 80 of the column. This causes the bulging of the column web to commence generally adjacent the side walls 80 of the column, rather than inwardly thereof as in the FIG. 3 arrangement, resulting in a more high strength connection.

From the foregoing description and accompanying drawings, it will be seen that the invention provides a spacer or connecting element for a structural unit such as for instance a storage rack arrangement, the latter including various knockdowm standardized structural components that may be expeditiously manufactured at a plant, handled, bundled and shipped to a point of use, where they can be rapidly assembled into a finished storage rack. The column structure of the structural unit may include hollow relatively thin wall, polygonal shaped in horizontal cross section, tubing which not only is relatively economical to utilize but which provides a high strength column, and means including the aforementioned spacer are provided on the cross member and load support assemblies extending between the columns of facilitate the connection of and secure the assemblies to the columns, and in a manner whereby the connections between the assemblies and the columns result in a highly rigid arrangement, to materially increase the rigidity of the storage rack.

The terms and expressions which have been used are used as terms of description and not of limitation, and there is no intention in the use of such terms and expressions of excluding any equivalents of any of the features shown or described, or any portions thereof, and it is recognized that various modifications are possible within the scope of the invention claimed.

What is claimed is:

1. A connecting plate-like member for securing a laterally extending connecting member adapted for coupling to said plate-like member, to a vertically oriented relatively thin walled column member of a structural unit, said plate-like member including laterally spaced column engaging portions and an intermediate recess portion adapted for disposal in confronting relation to a substantially planar web of the column member, means on said plate-like member for inserting an actuatable fastener through said plate-like member in fastening coaction with the web of the column member, whereby tightening actuation of the fastener will cause outward bulging of the column web at the connection of the fastener to the column, and into said recess portion, thereby causing prestressing of the column at the connection whereby the rigidity of the connection will be enhanced.

2. A connecting plate-like member in accordance with claim 1 wherein the column engaging portions at their column abutment surfaces are spaced apart a distance approximately equal to the transverse dimension of the column web.

3. A connecting plate-like member in accordance with claim 1 wherein the spaced column engaging portions extend generally obliquely with respect to the intermediate recess portion, and include means for causing generally line engagement of the column engaging portions of the plate-like member with the column web.

4. A connecting plate-like member in accordance with claim 1 wherein said plate-like member comprises a generally planar central section and laterally spaced diagonally arranged wing portions which in combination with said central section defines the recess portion, said plate-like member being formed of a single metal plate and formed into said configuration, and said inserting means comprising an opening extending through said plate-like member generally perpendicular to the plane of said central section and communicating one side of said central section to the other side thereof.

5. A connecting plate-like member in accordance with claim 4 wherein said wing portions extend lengthwise for a greater length than width, the transverse dimension of said recess portion being between approximately three to four times the width of one of said wing portions.

6. A connecting plate-like member in accordance with claim 1 wherein said column engaging portions include transversely extending substantially flat surfaces adapted for engagement with the confronting column member, said recess portion being disposed intermediate said flat surfaces, and being joined thereto by wall sections extending substantially perpendicular to the plane of said surfaces.

7. A connecting plate-like member in accordance with claim 1 wherein the latter member comprises a flat plate having an opening formed therein defining said recess portion, with the face of the plate being divided by said opening into said laterally spaced column engaging portions, and a further opening extending through the plate into communication with said formed opening and providing said insertion means.

8. A connecting plate-like member in accordance with claim 1 including other means connected to said plate-like member adjacent an extremity thereof and extending laterally therefrom in a direction generally opposite to the direction of depth of said recess portion, for aiding in attaching said plate-like member to an associated column.

9. A connecting plate-like member in accordance with claim 1 in combination with a laterally extending connecting member, the latter comprising an elongated generally horizontally oriented structural element attached at one of its ends to said connecting plate-like member, and means extending laterally from said plate-like member in a direction opposite to the direction of depth of said recess portion, for attaching coaction with an associated column member.

10. A connecting plate-like member or the like in combination with a laterally extending connecting member, the latter comprising an elongated diagonal brace element, with said connecting plate-like member being secured to one end of said brace element, said plate-like member including laterally spaced column engaging portions and an intermediate recess portion adapted for disposal in confronting relation to a substantially planar web of a column member, means on said plate-like member for inserting an actuatable fastener through said plate-like member in fastening coaction with the web of the column member, said column engaging portions being disposed in generally a vertical plane with the lengthwise axis of said brace element disposed in a plane extending generally obliquely to the first mentioned plane.

11. A connecting plate-like member in accordance with claim 8 wherein said other means includes spaced plates secured to said plate-like member and projecting laterally therefrom in planes disposed generally perpendicular to the plane of said column engaging portions.

12. A connecting plate-like member in accordance with claim 8 wherein said other means comprises a plate secured to the top of said connecting plate-like member adapted for attachment to the top of an associated column member, the last mentioned plate being substantially horizontally oriented.

* * * * *